(12) United States Patent
Wang et al.

(10) Patent No.: US 10,821,376 B2
(45) Date of Patent: Nov. 3, 2020

(54) HIGH-SPEED COUNTER-CURRENT CHROMATOGRAPH UNREELED BY GEAR RING

(71) Applicant: Shandong Analysis and Test Center, Jinan, Shandong (CN)

(72) Inventors: Xiao Wang, Jinan (CN); Daijie Wang, Jinan (CN); Yanling Geng, Jinan (CN); Jinqian Yu, Jinan (CN); Wei Liu, Jinan (CN); Li Cui, Jinan (CN)

(73) Assignee: SHANDONG ANALYSIS AND TEST CENTER, Jinan (CN)

( * ) Notice: Subject to any disclaimer, the term of this patent is extended or adjusted under 35 U.S.C. 154(b) by 44 days.

(21) Appl. No.: 16/098,782

(22) PCT Filed: May 10, 2017

(86) PCT No.: PCT/CN2017/083679
§ 371 (c)(1),
(2) Date: Nov. 2, 2018

(87) PCT Pub. No.: WO2018/149038
PCT Pub. Date: Aug. 23, 2018

(65) Prior Publication Data
US 2019/0126165 A1    May 2, 2019

(30) Foreign Application Priority Data

Feb. 15, 2017  (CN) .......................... 2017 1 0081339
Feb. 15, 2017  (CN) .......................... 2017 2 0135765

(51) Int. Cl.
*B01D 11/04*    (2006.01)
*B01D 15/18*    (2006.01)
(Continued)

(52) U.S. Cl.
CPC ........ *B01D 15/1807* (2013.01); *B01D 11/048* (2013.01); *F16H 1/28* (2013.01); *F16H 7/023* (2013.01); *G01N 30/42* (2013.01)

(58) Field of Classification Search
CPC ...... G01N 30/42; B01D 11/04; B01D 11/048; B01D 15/1807; B04B 5/02; F16H 1/28; F16H 67/023
See application file for complete search history.

(56) References Cited

U.S. PATENT DOCUMENTS

| | | | | |
|---|---|---|---|---|
| 4,277,017 A | * | 7/1981 | Leighton ................ | G01N 30/42 210/325 |
| 4,430,216 A | * | 2/1984 | Ito .......................... | G01N 30/42 210/198.2 |
| 4,487,693 A | * | 12/1984 | Ito .......................... | B01D 11/04 210/198.2 |

FOREIGN PATENT DOCUMENTS

| | | |
|---|---|---|
| CN | 2641652 Y | 9/2004 |
| CN | 200979541 Y | 11/2007 |

(Continued)

OTHER PUBLICATIONS

Nov. 20, 2017 International Search Report issued in International Patent Application PCT/CN2017/083679.

*Primary Examiner* — Benjamin L Lebron
(74) *Attorney, Agent, or Firm* — Oliff PLC (57) ABSTRACT

The present invention discloses a high-speed counter-current chromatograph unreeled by a gear ring, including an upper disc, a middle disc and a lower disc, wherein an unreeling gear ring coaxial with the middle disc is fixed above the middle disc, the lower disc is driven by a driving shaft to rotate, the unreeling gear ring is fixed, gear teeth of the unreeling gear ring are distributed on the inner ring thereof, multiple groups of gears engaged with the unreeling gear ring are arranged along the circumferential direction of the inner ring of the unreeling gear ring, gears between the adjacent groups are not engaged with each other, each group of gears includes two gears that are engaged with each other, wherein one gear drives a separation column, the other gear drives an unreeling shaft, the separation column is installed on a separation shaft, the upper ends of the unreeling shaft and the separation shaft are connected with the upper disc, and the lower ends are connected with the middle disc; meanwhile, the unreeling shaft and the separation column rotate with the rotating bracket; and after a liquid inlet tube passes through center shafts of the upper disc and the middle disc, infusion tubes of multiple groups of separation columns and unreeling shafts are sequentially connected in series therewith and finally led out from a liquid outlet tube.

13 Claims, 6 Drawing Sheets

(51) Int. Cl.
*F16H 1/28* (2006.01)
*F16H 7/02* (2006.01)
*G01N 30/02* (2006.01)
*G01N 30/42* (2006.01)

(56) References Cited

FOREIGN PATENT DOCUMENTS

| | | |
|---|---|---|
| CN | 101229452 A | 7/2008 |
| CN | 101806786 A | 8/2010 |
| CN | 201697905 U | 1/2011 |
| CN | 104569211 A | 4/2015 |
| JP | H02-243957 A | 9/1990 |

\* cited by examiner

HIGH-SPEED COUNTER-CURRENT CHROMATOGRAPH UNREELED BY GEAR RING

FIELD OF THE INVENTION

The present invention relates to the field of segregation analysis instruments, in particular to a high-speed counter-current chromatograph unreeled by a gear ring.

BACKGROUND OF THE INVENTION

High-speed counter-current chromatography is liquid-liquid partition chromatography without solid support filler, which achieves separation according to different partition coefficients of to-be-separated components in upper and lower phases. The principle is to use the centrifugal force generated by a spiral tube during the planetary motion to continuously mix mutually immiscible two-phase solvents, distribute a sample for multiple times, and realize separation according to the different partition coefficients of to-be-separated matters. As no solid carrier or support is required, efficient separation and preparation can be achieved within a short time, and several thousands of theoretical plates can be achieved. Compared with other types of separation chromatography, it not only overcomes the disadvantages of sample adsorption, loss, pollution and the like caused by a stationary phase carrier, but also has the advantages of low cost and solvent recovery, and so on.

A conventional high-speed counter-current chromatograph (e.g., ZL 02261047.2; ZL 00207386.2; ZL 201020245230.1) operates in a planetary centrifugal type, a planetary gear is coaxially installed on a large-diameter cylindrical spiral tube supporting member and is engaged with a fixed gear installed on the center axis of the instrument, and the two gears have exactly the same size and shape. Through such arrangement, the spiral tube supporting member can realize the synchronous planetary motion, that is, rotating around the center shaft of the instrument while rotating around its own axis in the same direction and at the same angular velocity.

The counter-current chromatograph of this structure has the disadvantages that: 1, it is liable to cause an excessive force on a center gear, and the stability of the instrument is poor due to the shake of the central shaft where the center gear is located caused by long-term operation; 2, meanwhile, due to the existence of a revolution gear and the center shaft, the β value of the instrument cannot be further increased, resulting in limited use functions of the instrument; and 3, in the high-speed counter-current chromatograph, the R size is an important parameter, the R size of the conventional high-speed counter-current chromatograph is usually fixed and cannot be adjusted, the design of a gear ring structure allows adjusting the size of the center gears in a separation column and an unreeling shaft, therefore, the R size can be conveniently adjusted, and the application range of the instrument is expanded.

SUMMARY OF THE INVENTION

In view of the technical difficulties existing in the conventional high-speed counter-current chromatograph, a high-speed counter-current chromatograph unreeled by a gear ring is proposed in the present invention patent, which has the advantages that: 1, novel synchronous unreeling is achieved by the engagement of a separation column and the gear ring and the engagement of the separation column and an unreeling shaft. The structure eliminates an intermediate gear and a center shaft, so that the β value of the high-speed counter-current chromatograph can be further increased; and 2, the engagement of a plurality of separation columns with the revolution gear in the previous patents becomes the engagement of the gear ring with the separation column, thereby reducing the noise of the instrument and prolonging the service life of the instrument.

The technical solutions adopted by the present invention are as follows:

A first technical solution provided by the present invention is as follows:

A high-speed counter-current chromatograph unreeled by a gear ring includes a rotating bracket, the rotating bracket includes an upper disc, a middle disc and a lower disc, which are sequentially installed and are connected together, an unreeling gear ring coaxial with the middle disc is fixed above the middle disc, the lower disc is driven by a driving shaft to rotate, the unreeling gear ring is fixed, gear teeth of the unreeling gear ring are distributed on the inner ring thereof, multiple groups of gears engaged with the unreeling gear ring are arranged along the circumferential direction of the inner ring of the unreeling gear ring, gears between the adjacent groups are not engaged with each other, each group of gears includes two gears that are engaged with each other, wherein one gear drives a separation column, the other gear drives an unreeling shaft, the separation column is installed on a separation shaft, the upper ends of the unreeling shaft and the separation shaft are connected with the upper disc, and the lower ends are connected with the middle disc; meanwhile, the unreeling shaft and the separation column rotate with the rotating bracket; and after a liquid inlet tube passes through center shafts of the upper disc and the middle disc, infusion tubes of multiple groups of separation columns and unreeling shafts are sequentially connected in series therewith and finally led out from a liquid outlet tube.

The second technical solution provided by the present invention is as follows:

A high-speed counter-current chromatograph unreeled by a gear ring includes a rotating bracket, the rotating bracket includes an upper disc, a middle disc and a lower disc, which are sequentially installed and are connected together, an unreeling gear ring coaxial with the middle disc is fixed above the middle disc, the lower disc is driven by a driving shaft to rotate, the unreeling gear ring is fixed, gear teeth of the unreeling gear ring are distributed on the inner ring thereof, a plurality of gears I engaged with the unreeling gear ring are arranged along the circumferential direction of the inner ring of the unreeling gear ring, the gears I between adjacent groups are not engaged with each other, the gears I drive a separation column to rotate, a gear II is coaxially installed below each gear I, the gear II is engaged with a gear III, and the gear III drives an unreeling shaft to rotate; the separation column is installed on a separation shaft, the upper ends of the unreeling shaft and the separation shaft are connected with the upper disc, and the lower ends are connected with the middle disc; meanwhile, the unreeling shaft and the separation column rotate with the rotating bracket; and after a liquid inlet tube passes through center shafts of the upper disc and the middle disc, infusion tubes of multiple groups of separation columns and unreeling shafts are sequentially connected in series therewith and finally led out from a liquid outlet tube.

In the above two technical solutions, further, after the liquid inlet tube passes through the center shafts of the upper disc and the middle disc, the liquid inlet tube is connected with joints of inlet ends of a group of unreeling shafts, and outlet ends of the unreeling shafts are connected with joints of inlet ends of the separation columns through the infusion tubes; outlet ends of the separation columns are connected with joints of inlet ends of the next group of unreeling shafts through the infusion tubes; and the multiple groups of unreeling shafts and separation columns are sequentially connected in series therewith and finally led out from the liquid outlet tube.

Or, after the liquid inlet tube passes through the center shafts of the upper disc and the middle disc, the liquid inlet tube is connected with joints of inlet ends of a group of separation columns, and outlet ends of the separation columns are connected with joints of inlet ends of the unreeling shafts through the infusion tubes; outlet ends of the unreeling shafts are connected with joints of inlet ends of the next group of separation columns through the infusion tubes; and the multiple groups of unreeling shafts and separation columns are sequentially connected in series therewith and finally led out from the liquid outlet tube.

In the above two technical solutions, further, the bottom of each gear is supported by a mounting plate, a limiting pressure block is arranged on the mounting plate, and the limiting pressure block limits the unreeling shaft and the separation column.

In the above two technical solutions, further, the center of the lower disc is driven by a driving shaft to rotate.

In the above two technical solutions, further, a synchronous pulley is installed on the driving shaft, a motor drives the synchronous pulley to rotate through a synchronous belt so as to achieve the rotation of the lower disc; and as the upper disc, the middle disc and the lower disc are respectively connected together through connecting columns, the rotation of the lower disc realizes the rotation of the entire rotating bracket.

In the above two technical solutions, further, a fixing shaft is installed at the center of the upper disc.

In the above two technical solutions, further, the unreeling gear ring is fixed by a fixing bracket, and the fixing shaft passes through the fixing bracket.

In the above two technical solutions, further, the liquid inlet tube is fixed by a fixing hard tube, the fixing hard tube passes through the fixing shaft and extends to the bottom of the middle disc, and the function of the fixing hard tube is to fix the liquid inlet tube to prevent the same from rotating with the bracket.

In the above two technical solutions, further, the high-speed counter-current chromatograph unreeled by the gear ring further includes a cooling device.

The beneficial effects of the present invention are as follows:

The present invention patent proposes the high-speed counter-current chromatograph unreeled by the gear ring in view of the technical difficulties existing in the conventional high-speed counter-current chromatograph, and the present invention has the advantages that:

1, the engagement of a plurality of separation columns with the revolution gear in the previous patents becomes the engagement of the gear ring with the separation column, thereby reducing the noise of the instrument and prolonging the service life of the instrument;

2, novel synchronous unreeling is achieved by the engagement of the separation column and the gear ring and the engagement of the separation column and the unreeling shaft;

3, the structure eliminates the intermediate gear, the center shaft can be thinned, and the β value of the instrument can be further increased; and 4, the design of the gear ring structure allows adjusting the size of the center gears in the separation column and the unreeling shaft, therefore, the R size can be conveniently adjusted, and the application range of the instrument is expanded.

REFERENCE SIGNS

1—liquid inlet tube; 2—fixing shaft; 3—bearing seat; 4—gear ring fixing frame; 5—upper disc; 6—separation column; 7—connecting column; 8—gear ring; 9—middle disk; 10—liquid outlet tube; 11—connecting column; 12—lower disc; 14—driving shaft; 15—fixing hard tube bracket; 16—fixing hard tube; 17—bearing; 18—fixing frame; 19—unreeling shaft 20—gear I; 21—joint; 22—bearing; 23—synchronous pulley; 24—seat pressing strip; 25—splicing bearing seat; 26—gear II; 27—gear III; 28—self-winding hose; 30—outer shell metal plate top; 31—triangular iron frame; 32—frequency converter and other electrical components; 33—motor; 34—cooling copper tube; 35—intermediate rotating large separator column group; 36—metal plate outer shell; 37—bottom plate; 38—truckle; 39—bottom plate small closure plate; 40—top display; 41—top switch button; 42—lower fixing hard tube; 43—lower fixing hard tube bracket.

DETAILED DESCRIPTION OF THE EMBODIMENTS

It should be noted that the following detailed description is illustrative and are intended to provide further illustration of the present application. All technical and scientific terms used herein have the same meanings as commonly understood by those of ordinary skill in the art to which the present application belongs, unless otherwise indicated.

It should be noted that the terms used herein are for the purpose of describing specific embodiments only, and are not intended to limit the exemplary embodiments of the present application. As used herein, the singular forms are also intended to include the plural forms, unless the context clearly indicates otherwise. In addition, it should also be understood that, when the terms "include" and/or "comprise" are used in the specification, they indicate the presence of features, steps, operations, devices, components, and/or combinations thereof.

As described in the background art, the prior art has the following disadvantages: 1, it is liable to cause an excessive force on a center gear, and the stability of the instrument is poor due to the shake of the central shaft where the center gear is located caused by long-term operation; 2, meanwhile, due to the existence of a revolution gear and the center shaft, the β value of the instrument cannot be further increased, resulting in limited use functions of the instrument; and 3, in the high-speed counter-current chromatograph, the R size is an important parameter, the R size of the conventional high-speed counter-current chromatograph is usually fixed and cannot be adjusted, the design of a gear ring structure allows adjusting the size of the center gears in a separation column and an unreeling shaft, therefore, the R size can be conveniently adjusted, and the application range of the instrument is expanded. In order to solve the above technical problems, the present application provides two high-speed counter-current chromatographs unreeled by gear rings.

Embodiment 1

Figure 1:
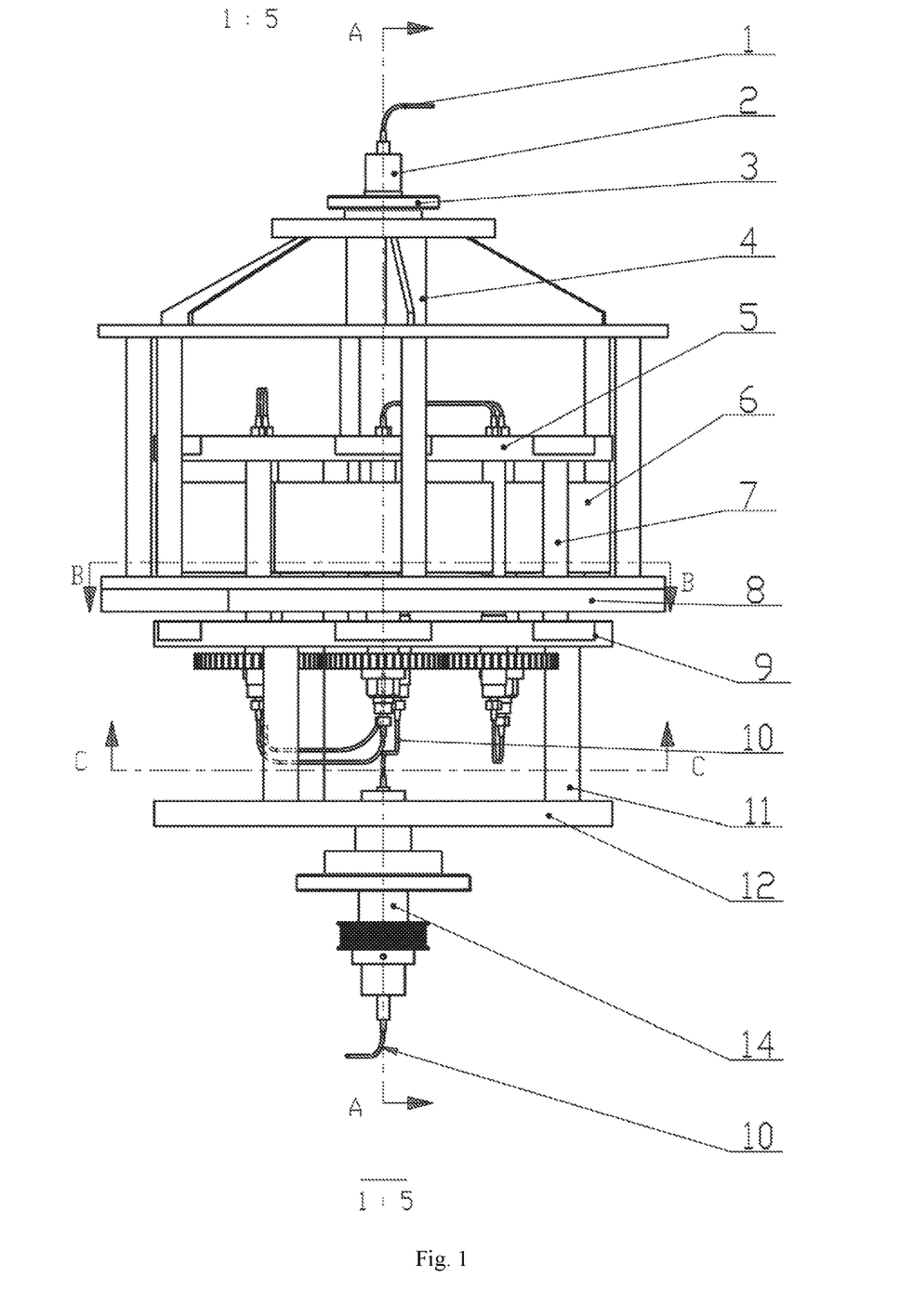
FIG. 1 is a front view of a high-speed counter-current chromatograph unreeled by a gear ring.
Figure 2:
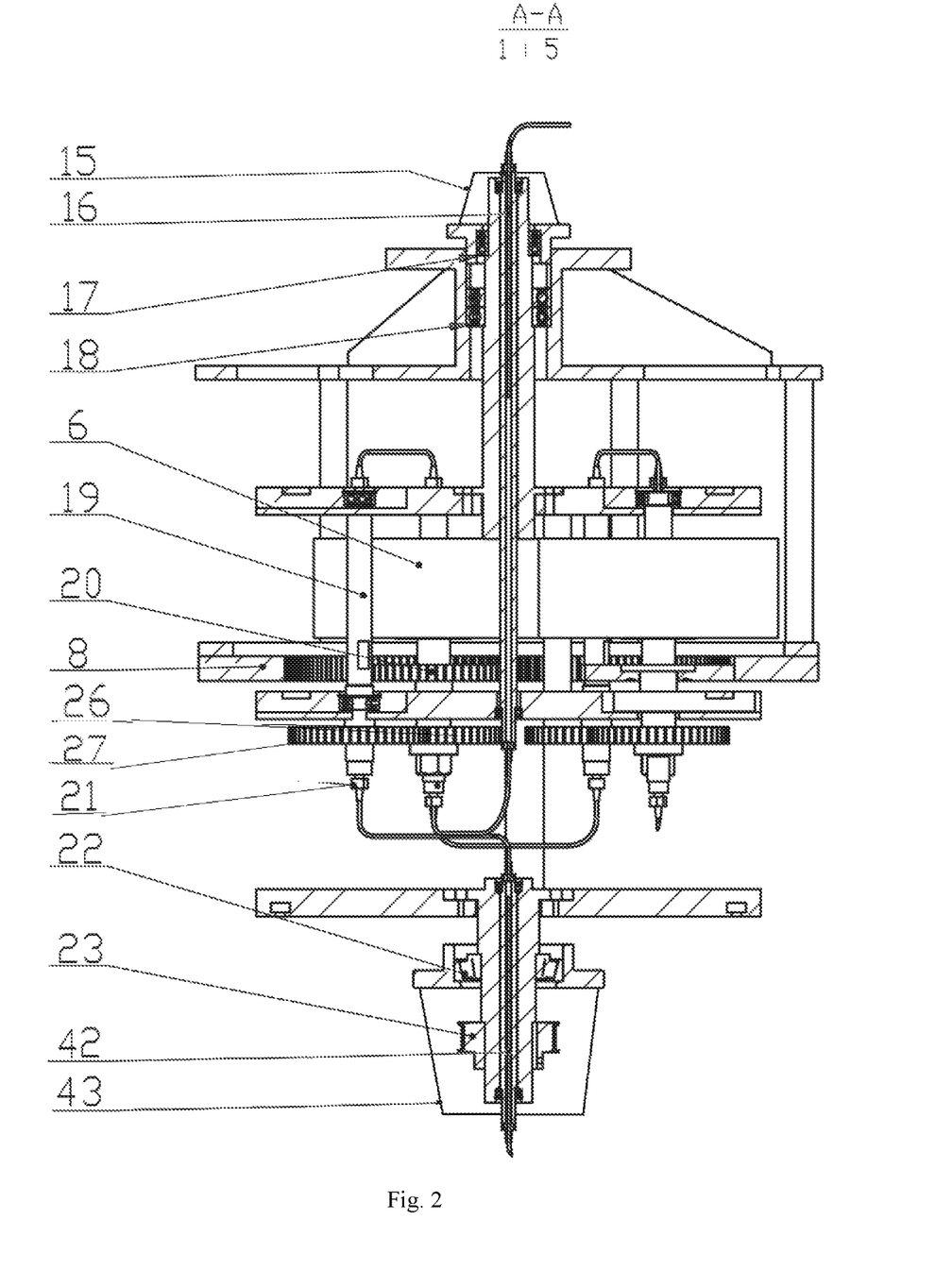
FIG. 2 is a side view of a high-speed counter-current chromatograph unreeled by a gear ring.
Figure 3:
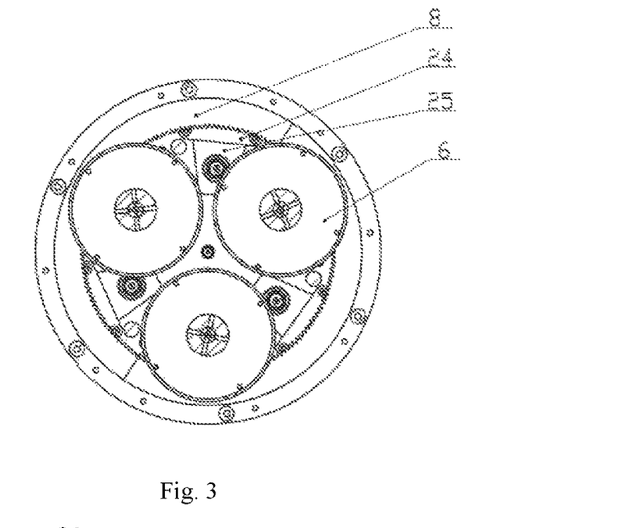
FIG. 3 is a schematic diagram of a gear ring of a high-speed counter-current chromatograph unreeled by a gear ring.
Figure 4:
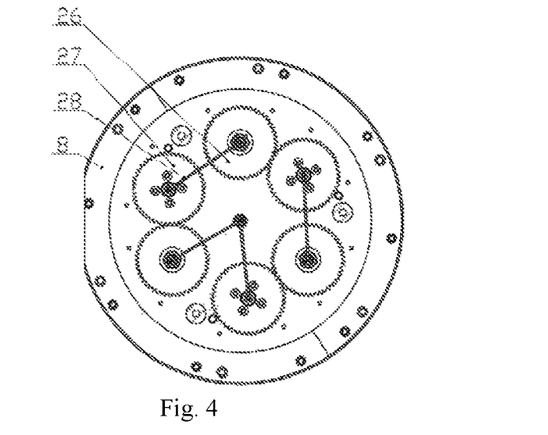
FIG. 4 is a schematic diagram of a connection of separation column and an unreeling shaft of a high-speed counter-current chromatograph unreeled by a gear ring.
Figure 5:
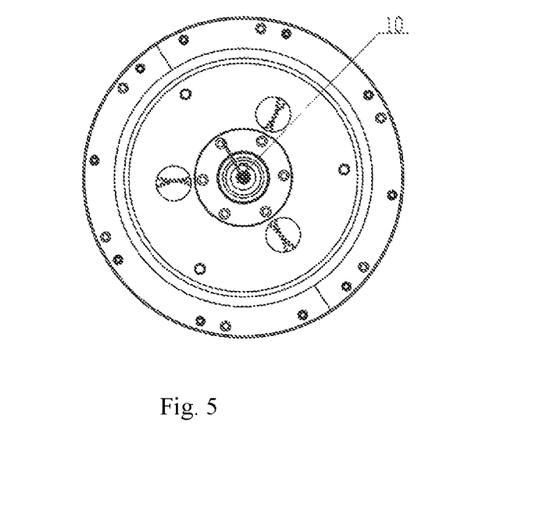
FIG. 5 is a bottom view of a high-speed counter-current chromatograph unreeled by a gear ring.
Figure 6:
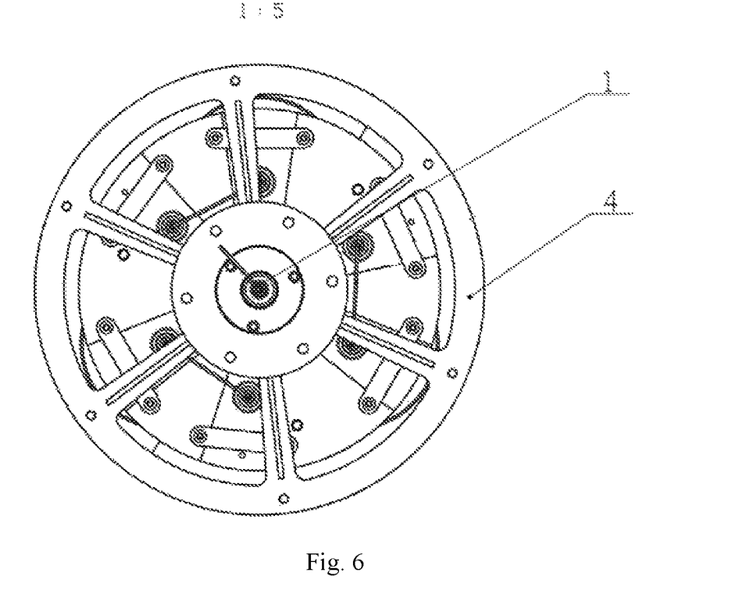
FIG. 6 is a top view of a high-speed counter-current chromatograph unreeled by a gear ring.

As shown in FIGS. 1 to 2, a high-speed counter-current chromatograph unreeled by a gear ring includes a rotating bracket, the rotating bracket includes an upper disc 5, a middle disc 8 and a lower disc 12, which are sequentially installed and are connected together through a connecting column 7, an unreeling gear ring 8 coaxial with the middle disc is fixed above the middle disc 9, the lower disc 12 is driven by a driving shaft 14 to rotate, the unreeling gear ring 8 is fixed, gear teeth of the unreeling gear ring 8 are distributed on the inner ring thereof, a plurality of gears I 20 engaged with the unreeling gear ring are arranged along the circumferential direction of the inner ring of the unreeling gear ring 8, the gears I 20 between adjacent groups are not engaged with each other, the gears I 20 drive a separation column to rotate, a gear II 26 is coaxially installed below each gear I 20, the gear II 26 is engaged with a gear III 27, and the gear III 27 drives an unreeling shaft 19 to rotate; the separation column 6 is installed on a separation shaft, the upper ends of the unreeling shaft and the separation shaft are connected with the upper disc 5, and the lower ends are connected with the middle disc 9; meanwhile, the unreeling shaft and the separation column rotate with the rotating bracket; and after a liquid inlet tube passes through center shafts of the upper disc 5 and the middle disc 9, infusion tubes of multiple groups of separation columns and unreeling shafts are sequentially connected in series therewith and finally led out from a liquid outlet tube.

In the technical solution, the unreeling gear for driving the unreeling shaft and the driving gear for driving the separation column are arranged on two different planes, and the driven gear is placed under the driving gear, which can facilitate the assembly of the entire system.

Further, after the liquid inlet tube 1 passes through the center shafts of the upper disc 5 and the middle disc 9, the liquid inlet tube is connected with joints 21 of inlet ends of a group of unreeling shafts, and outlet ends of the unreeling shafts 19 are connected with joints of inlet ends of the separation columns through self-unreeling hoses 28; outlet ends of the separation columns are connected with joints of inlet ends of the next group of unreeling shafts through the self-unreeling hoses 28; and the multiple groups of unreeling shafts and separation columns are sequentially connected in series therewith and finally discharged from the liquid outlet tube 10; and the liquid outlet tube 10 is fixed by a lower fixing hard tube 42, and the lower fixing hard tube passes through the driving shaft 14; and the lower fixing hard tube 42 is fixed by a fixing bracket 43.

Or, after the liquid inlet tube passes through the center shafts of the upper disc and the middle disc, the liquid inlet tube is connected with joints of inlet ends of a group of separation columns, and outlet ends of the separation columns are connected with joints of inlet ends of the unreeling shafts through the self-unreeling hoses 28; outlet ends of the unreeling shafts are connected with joints of inlet ends of the next group of separation columns through the self-unreeling hoses 28; and the multiple groups of unreeling shafts and separation columns are sequentially connected in series therewith and finally led out from the liquid outlet tube.

Infusion tubes pass through the interior of the unreeling shafts 19, and the self-unreeling hoses 28 and the infusion tubes have the same function and are used for conveying liquid.

Further, the bottom of each gear is supported by a mounting plate, a limiting pressure block is arranged on the mounting plate, and the limiting pressure block limits the unreeling shaft and the separation column.

Further, the center of the lower disc is driven by a driving shaft 14 to rotate; and the driving shaft 14 is fixed and supported by a bearing 22, and the bearing 22 is fixed and supported by a bearing seat.

Further, a synchronous pulley 23 is installed on the driving shaft, a motor 33 drives the synchronous pulley to rotate through a synchronous belt so as to achieve the rotation of the lower disc; and as the upper disc, the middle disc and the lower disc are respectively connected together through connecting columns, the rotation of the lower disc realizes the rotation of the entire rotating bracket.

Further, a fixing shaft 2 is installed at the center of the upper disc and is fixed by a bearing 17, and the bearing 17 is fixed by a bearing seat 3.

Further, the unreeling gear ring is fixed by a fixing bracket, and the fixing shaft 2 passes through the fixing bracket 4 and is fixed by a bearing 18.

Further, the liquid inlet tube is fixed by a fixing hard tube 16, the fixing hard tube passes through the fixing shaft and extends to the bottom of the middle disc, and the function of the fixing hard tube is to fix the liquid inlet tube to prevent the same from rotating with the bracket.

The fixing hard tube 16 is fixed by a bracket 15.

Embodiment 2

The embodiment is not illustrated in the figures.

A high-speed counter-current chromatograph unreeled by a gear ring includes a rotating bracket, the rotating bracket includes an upper disc, a middle disc and a lower disc, which are sequentially installed and are connected together, an unreeling gear ring coaxial with the middle disc is fixed above the middle disc, the lower disc is driven by a driving shaft to rotate, the unreeling gear ring is fixed, gear teeth of the unreeling gear ring are distributed on the inner ring thereof, multiple groups of gears engaged with the unreeling gear ring are arranged along the circumferential direction of the inner ring of the unreeling gear ring, gears between the adjacent groups are not engaged with each other, each group of gears includes two gears that are engaged with each other, wherein one gear drives a separation column, the other gear drives an unreeling shaft, the separation column is installed on a separation shaft, the upper ends of the unreeling shaft and the separation shaft are connected with the upper disc, and the lower ends are connected with the middle disc; meanwhile, the unreeling shaft and the separation column rotate with the rotating bracket; and after a liquid inlet tube passes through center shafts of the upper disc and the middle disc, infusion tubes of multiple groups of separation columns and unreeling shafts are sequentially connected in series therewith and finally led out from a liquid outlet tube.

The rest structures are completely the same as those of the embodiment 1; and the difference lies in that the gear II is omitted in the embodiment, the gear III and the gear I are located on the same plane, but the embodiment is also within the protection scope of the present invention.

Figure 7:
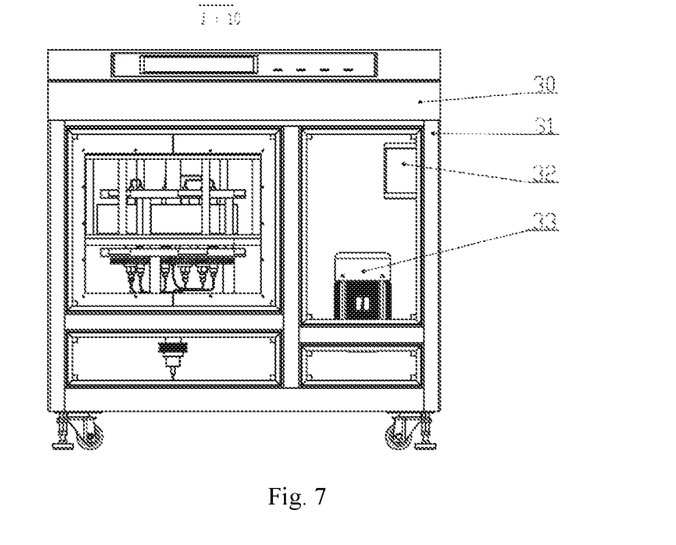
FIG. 7 is an assembly front view of a high-speed counter-current chromatograph unreeled by a gear ring.
Figure 8:
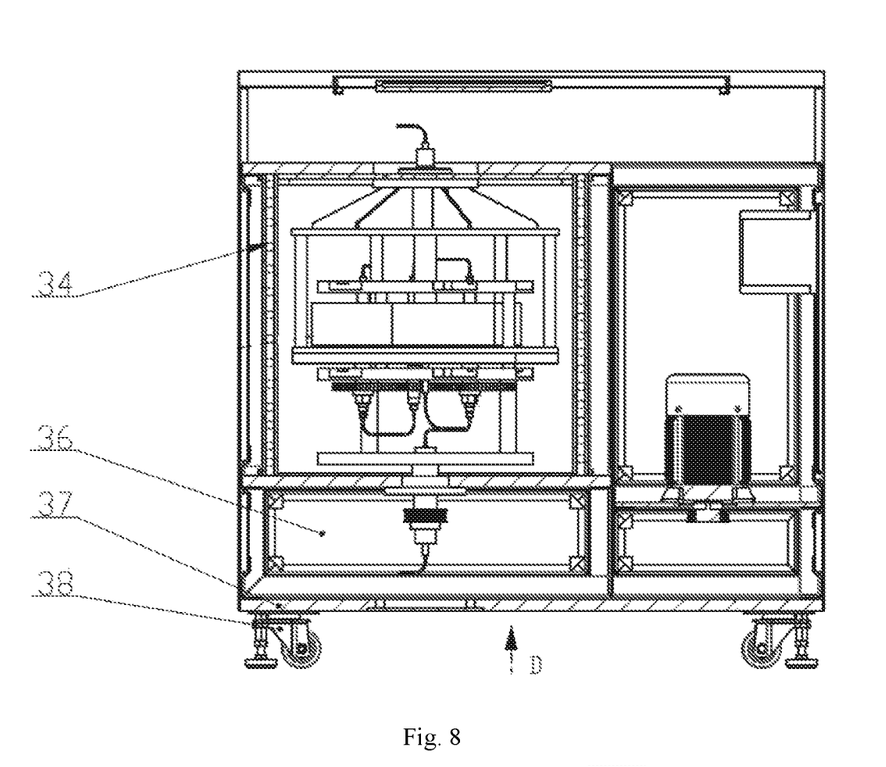
FIG. 8 is an assembly rear view of a high-speed counter-current chromatograph unreeled by a gear ring.
Figure 9:
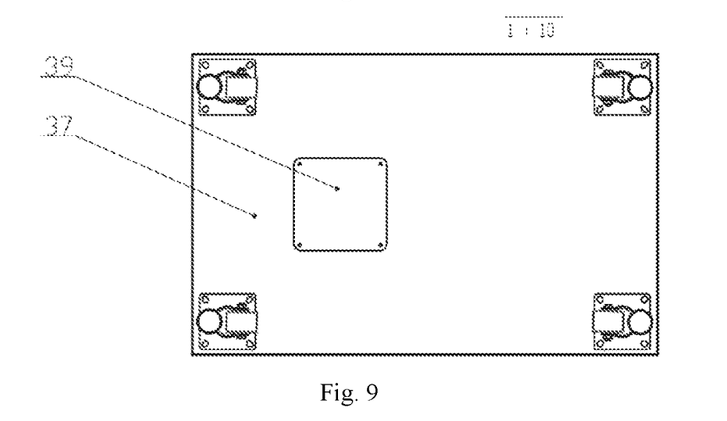
FIG. 9 is a bottom view of a high-speed counter-current chromatograph unreeled by a gear ring.
Figure 10:
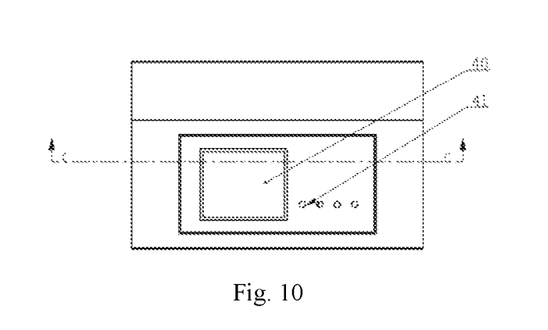
FIG. 10 is a schematic diagram of a control panel of a high-speed counter-current chromatograph unreeled by a gear ring.

The device in the embodiment 1 and the embodiment 2 is installed in a shell, as shown in FIG. 7, the shell includes an outer shell metal plate top plate 30, a metal plate outer shell 36, a bottom plate 37 and a triangular iron frame 31, truckles 38 are installed at the bottom of the bottom plate, and a bottom plate small closure plate 39 is installed at the bottom of the bottom plate 37; and the motor 33 is installed in the iron frame and is driven by a frequency converter 32, a cooling copper tube 34 is further installed around the device, the motor is connected with a top display 40, and the motor is further connected with a top switch button 41.

The device in the embodiment 1 and the embodiment 2 has two unreeling modes:

First mode: making the radius of the unreeling gear ring equal to triple of the radius of the gear for driving the separation column to rotate; and this mode achieves self-unreeling.

Second mode: the joint set at the inlet end of the separation column or the unreeling shaft connected with the liquid inlet tube is a rotary joint; and the joint arranged at the outlet end of the separation column or the unreeling shaft connected with the liquid outlet tube is a rotary joint; passive unreeling is achieved through the rotary joints; and the two modes are both feasible.

Novel synchronous unreeling is achieved by the engagement of the separation column gear and the gear ring and the engagement of the separation column gear and the unreeling shaft gear; the structure eliminates the intermediate gear and the center shaft, so that the β value of the instrument can be further increased; and 2, the engagement of a plurality of separation columns with the revolution gear in the prior art becomes the engagement of the gear ring with the separation column, thereby reducing the noise of the instrument and prolonging the service life of the instrument.

Although the specific embodiments of the present invention have been described above in combination with the drawings, the protection scope of the present invention is not limited thereto. Those skilled in the art to which the present invention belongs should understand that, various modifications or variations, obtained by those skilled in the art based on the technical solutions of the present invention without any creative effort, still fall into the protection scope of the present invention.

The invention claimed is:

1. A counter-current chromatograph comprising:
   a rotating bracket including an upper disc, a lower disc, and a middle disc connected between the upper disc and the lower disc;
   a fixing shaft disposed at a center of the upper disc;
   a gear ring configured to unreel tubing, the gear ring being coaxial with the middle disc and fixed by a fixing bracket on a first side of the middle disc, the fixing shaft passing through the fixing bracket, the lower disc being configured to rotate by a driving shaft, the gear ring being fixed, the gear ring including an inner ring and a plurality of gear teeth disposed on the inner ring;
   a plurality of groups of gears engaged with the gear teeth of the gear ring and disposed along a circumferential direction of the inner ring of the gear ring, each group of gears of the plurality of groups of gears includes two gears engaged with each other, a first gear of each group of gears of the plurality of groups of gears is configured to drive a separation column and configured to not engage a first gear of an adjacent group of gears of the plurality of groups of gears, a second gear of each group of gears of the plurality of groups of gears is configured to drive an unreeling shaft and configured to not engage a second gear of the adjacent group of gears of the plurality of groups of gears, the separation column being disposed on a separation shaft, an upper end of the unreeling shaft and an upper end of the separation shaft being connected to the upper disc, and a lower end of the unreeling shaft being connected to the middle disc, the unreeling shaft and the separation column being configured to rotate with the rotating bracket;
   a liquid inlet tube passing through a center shaft of the upper disc and a center shaft of the middle disc; and
   a plurality of infusion tubes configured to be separately driven by the two gears of each group of gears of the plurality of groups of gears, the plurality of infusion tubes being sequentially connected in series and connected to a liquid outlet tube.

2. The counter-current chromatograph according to claim 1, wherein:
   the liquid inlet tube is connected with a plurality of joints of inlet ends of a group of the plurality of unreeling shafts between the middle disc and the lower disc, and a plurality of outlet ends of the plurality of unreeling shafts are connected with a plurality of joints of inlet ends of a plurality of separation columns including the separation column through the plurality of infusion tubes,
   a plurality of outlet ends of the plurality of separation columns are connected with the plurality of joints of inlet ends of an adjacent group of the plurality of unreeling shafts through the infusion tubes, and
   the group and the adjacent group of the plurality of unreeling shafts and the plurality of separation columns are sequentially connected in series and connected to the liquid outlet tube.

3. The counter-current chromatograph according to claim 1, wherein:
   the liquid inlet tube is connected with a plurality of joints of inlet ends of a group of a plurality of separation columns including the separation column between the middle disc and the lower disc, and a plurality of outlet ends of the plurality of separation columns are connected with the plurality of joints of inlet ends of a plurality of unreeling shafts including the unreeling shaft through the plurality of infusion tubes,
   a plurality of outlet ends of the plurality of unreeling shafts are connected with a plurality of joints of inlet ends of an adjacent group of the plurality of separation columns through the plurality of infusion tubes, and
   the plurality of unreeling shafts and the plurality of separation columns are sequentially connected in series and connected to the liquid outlet tube.

4. The counter-current chromatograph according to claim 1, wherein a center of the lower disc is configured to be rotated by a driving shaft.

5. The counter-current chromatograph according to claim 1, wherein:
  a synchronous pulley is disposed on the driving shaft,
  a motor is configured to rotate the synchronous pulley through a synchronous belt so as to rotate the lower disc; and
  as the upper disc, the middle disc, and the lower disc are respectively connected through a plurality of connecting columns such that rotating the lower disc rotates the entire rotating bracket.

6. The counter-current chromatograph unreeled by the gear ring according to claim 1, wherein the liquid inlet tube is fixed by a fixing hard tube, the fixing hard tube passing through the fixing shaft and extending to a bottom side of the middle disc, the fixing hard tube being configured to fix the liquid inlet tube so as to prevent the liquid inlet tube from rotating with the bracket.

7. The counter-current chromatograph unreeled by the gear ring according to claim 1, further comprising a cooling device.

8. A counter-current chromatograph comprising:
  a rotating bracket including an upper disc, a lower disc, and a middle disc connected between the upper disc and the lower disc;
  a fixing shaft disposed at a center of the upper disc;
  a gear ring configured to unreel tubing, the gear ring being coaxial with the middle disc and fixed by a fixing bracket on a first side of the middle disc, the fixing shaft passing through the fixing bracket, the lower disc being configured to rotate by a driving shaft, the gear ring being fixed, the gear ring including an inner ring and a plurality of gear teeth disposed on the inner ring;
  a plurality of groups of ears engaged to the plurality of gear teeth of the gear ring and arranged along a circumferential direction of the inner ring, each group of the plurality of groups of gears includes a first gear, a second gear, and a third gear, the first gears of each group of the plurality of groups of gears being engaged with the gear teeth of the gear ring and arranged along the circumferential direction of the inner ring of the gear ring, each second gear of each group of the plurality of groups of gears being engaged with each third gear of each group of the plurality of groups of gears and disposed coaxially below each first gear of each group of the plurality of groups of gears, and each third gear of each group of the plurality of groups of gears being configured to rotate a corresponding unreeling shaft of a plurality of unreeling shafts, first gears of adjacent groups of the plurality of groups of gears are configured to remain not engaged with each other and are configured to rotate a separation column, the separation column being disposed on a separation shaft, an upper end of each unreeling shaft of the plurality of unreeling shafts and an upper end of the separation shaft are connected to the upper disc, and the lower end of each unreeling shaft of the plurality of unreeling shafts is connected with the middle disc, each unreeling shaft of the plurality of unreeling shafts and the separation column being configured to rotate with the rotating bracket;
  a liquid inlet tube passing through a center shaft of the upper disc and a center shaft of the middle disc; and
  a plurality of infusion tubes configured to be driven by the first gear of each group of the plurality of groups of gears; the plurality of unreeling shafts being sequentially connected in series and connected to a liquid outlet tube.

9. The counter-current chromatograph unreeled by the gear ring according to claim 8, wherein:
  the liquid inlet tube is connected with a plurality of joints of inlet ends of a group of the plurality of unreeling shafts between the middle disc and the lower disc, and a plurality of outlet ends of the plurality of unreeling shafts are connected with a plurality of joints of inlet ends of a plurality of separation columns including the separation column through the plurality of infusion tubes,
  a plurality of outlet ends of the plurality of separation columns are connected with the plurality of joints of inlet ends of an adjacent group of the plurality of unreeling shafts through the infusion tubes, and
  the group and the adjacent group of the plurality of unreeling shafts and the plurality of separation columns are sequentially connected in series and connected to the liquid outlet tube.

10. The counter-current chromatograph according to claim 8, wherein:
  the liquid inlet tube is connected with a plurality of joints of inlet ends of a group of a plurality of separation columns including the separation column between the middle disc and the lower disc, and a plurality of outlet ends of the plurality of separation columns are connected with the plurality of joints of inlet ends of a plurality of unreeling shafts including the unreeling shaft through the plurality of infusion tubes,
  a plurality of outlet ends of the plurality of unreeling shafts are connected with a plurality of joints of inlet ends of an adjacent group of the plurality of separation columns through the plurality of infusion tubes, and
  the plurality of unreeling shafts and the plurality of separation columns are sequentially connected in series and connected to the liquid outlet tube.

11. The counter-current chromatograph according to claim 8, wherein a center of the lower disc is configured to be rotated by a driving shaft.

12. The counter-current chromatograph according to claim 8, wherein:
  a synchronous pulley is disposed on the driving shaft,
  a motor is configured to rotate the synchronous pulley through a synchronous belt so as to rotate the lower disc; and
  as the upper disc, the middle disc, and the lower disc are respectively connected through a plurality of connecting columns such that rotating the lower disc rotates the entire rotating bracket.

13. The counter-current chromatograph according to claim 8, further comprising a cooling device.

* * * * *